(12) United States Patent
Park (10) Patent No.: US 8,605,074 B2
(45) Date of Patent: Dec. 10, 2013

(54) METHOD AND APPARATUS FOR SUPPLYING POWER TO A DISPLAY APPARATUS

(75) Inventor: Sung-Un Park, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 178 days.

(21) Appl. No.: 13/137,180

(22) Filed: Jul. 26, 2011

(65) Prior Publication Data

US 2012/0044231 A1 Feb. 23, 2012

(30) Foreign Application Priority Data

Aug. 20, 2010 (KR) .................. 10-2010-0080884

(51) Int. Cl.
 *G06F 3/038* (2013.01)
(52) U.S. Cl.
 USPC .......................................... 345/211; 345/204
(58) Field of Classification Search
 None
 See application file for complete search history.

(56) References Cited

U.S. PATENT DOCUMENTS

| 6,948,081 | B2 | 9/2005 | Lee |
| 2004/0027099 | A1 | 2/2004 | Fujii |
| 2008/0111811 | A1 | 5/2008 | Park |
| 2009/0109147 | A1 | 4/2009 | Park et al. |
| 2009/0224603 | A1 | 9/2009 | Perper et al. |

FOREIGN PATENT DOCUMENTS

| EP | 0 954 081 A2 | 11/1999 |
| EP | 2056282 A2 | 5/2009 |
| KR | 2003-0006718 | 1/2003 |
| KR | 10-2004-0028422 A | 4/2004 |
| KR | 10-2009-0074367 A | 7/2009 |
| KR | 10-2010-0010134 A | 2/2010 |

OTHER PUBLICATIONS

European Search Report in EP 11178176.1-1228, dated Feb. 22, 2012 (Park).
Extended European Search Report in EP 11178176.1-1228, dated Apr. 4, 2013 (Park).
STMicroelectronics, LM117/217 LM317: 1.2V to 37V Voltage Regulator, Internet Citation, Sep. 2004, pp. 1-15, XP002352318, Retrieved from the Internet. URL: France www.st.com.
European Examination dated Sep. 18, 2013.

*Primary Examiner* — Jason Olson
(74) *Attorney, Agent, or Firm* — Lee & Morse, P.C.

(57) ABSTRACT

An apparatus for supplying a power voltage to a pixel unit of a display apparatus includes a first power supplying unit for applying the power voltage to the pixel unit during a normal mode, a second power supplying unit for applying the power voltage to the pixel unit during a low power display mode, and a leakage current blocking unit for blocking a leakage current path from the second power supplying unit to the first power supplying unit during the low power display mode.

16 Claims, 6 Drawing Sheets

METHOD AND APPARATUS FOR SUPPLYING POWER TO A DISPLAY APPARATUS

BACKGROUND

1. Field

Embodiments relate to methods and apparatuses for supplying power to display apparatuses.

2. Description of the Related Art

A display device displays an image corresponding to input image data by applying a scan signal and a data voltage to a plurality of pixels. Each pixel receives at least one power voltage to operate. To this end, the display device generates at least one power voltage to be applied to a display panel from a voltage applied by an external power supply.

As display devices have been applied to mobile apparatuses such as cellular phones, digital cameras, and the like, it has become important to reduce power consumption of the display devices. In general, since a mobile apparatus is driven by a battery, reduction of power consumption is needed to be able to use the mobile apparatus for a long period of time. Since a display device used in a mobile apparatus has higher power consumption than any other component in the mobile apparatus, reduction of power consumption of the display device is needed to realize mobile apparatuses with longer battery lives.

SUMMARY

Embodiments are therefore directed to a method and apparatus for supplying power to a display apparatus, which substantially overcome one or more of the problems due to the limitations and disadvantages of the related art.

It is therefore a feature of an embodiment to provide methods and apparatuses for supplying power to display apparatuses that reduce or prevent power loss due to a leakage current during a low power display mode that is an operation mode for reducing power consumption of the display apparatuses.

At least one of the above and other features and advantages may be realized by providing an apparatus for supplying power for a display apparatus and for applying a power voltage to a pixel unit, the apparatus including a first power supplying unit for applying the power voltage to the pixel unit during a normal mode; a second power supplying unit for applying the power voltage to the pixel unit during a low power display mode; and a leakage current blocking unit for blocking a leakage current path from the second power supplying unit to the first power supplying unit during the low power display mode.

The first power supplying unit may include a first power voltage output terminal for outputting the power voltage, wherein the second power supplying unit may include a second power voltage output terminal for outputting the power voltage, wherein the leakage current blocking unit may include a diode between the first power voltage output terminal and the second power voltage output terminal, wherein an anode of the diode is connected to the first power voltage output terminal, and wherein a cathode of the diode is connected to the second power voltage output terminal.

The leakage current blocking unit may include a switching device that is disposed on the leakage current path, and wherein the switching device may be controlled so as to be turned-off during the low power display mode.

The first power supplying unit may include an output amplifier for outputting the power voltage, wherein the output amplifier may include a feedback loop that is formed between an output terminal of the output amplifier and a second input terminal of the output amplifier, wherein the feedback loop may include an intermediate node that is directly or indirectly coupled to a ground line, and wherein the switching device may be disposed between the output terminal of the output amplifier and the intermediate node.

The output amplifier may include a first input terminal for receiving an output-terminal reference voltage, the second input terminal connected to the intermediate node, and the output terminal of the output amplifier connected to the first power voltage output terminal, wherein the first power supplying unit may include a first resistor that is connected in series to the switching device between the output terminal of the output amplifier and the intermediate node, and a second resistor connected to the intermediate node and the ground line.

The first power supplying unit may be a DC-DC converter, and the second power supplying unit may be a timing controller for supplying a driving control signal to a data driving unit and a gate driving unit of the display apparatus.

The second power supplying unit may include a control signal generating unit for generating a driving control signal for driving a data driving unit and a gate driving unit of the display apparatus, and for outputting the driving control signal to the data driving unit and the gate driving unit; and a power voltage generating unit for generating the power voltage.

The first power voltage supplying unit may include a first power voltage output terminal for outputting the power voltage, wherein the second power supplying unit may include a second power voltage output terminal for outputting the power voltage, and wherein the first power voltage output terminal and the second power voltage output terminal may be electrically connected to each other.

The low power display mode may be an operation mode for reducing brightness of the display apparatus, or for operating the pixel unit in such a way that only a portion of the pixel unit emits light.

The first power supplying unit may be activated and the second power supplying unit may be inactivated, during the normal mode, and the first power supplying unit may be inactivated and the second power supplying unit may be activated, during low power display mode.

The power voltage output from the first power supplying unit and the power voltage output from the second power supplying unit may have different voltage levels.

At least one of the above and other features may be realized by providing a method of supplying power for a display apparatus and for applying a power voltage to a pixel unit, the method including applying the power voltage to the pixel unit during a normal mode via a first power supplying unit; applying the power voltage to the pixel unit during a low power display mode via a second power supplying unit; and blocking a leakage current path from the second power supplying unit to the first power supplying unit during the low power display mode via a leakage current blocking unit.

The first power supplying unit may output the power voltage through a first power voltage output terminal, wherein the second power supplying unit outputs the power voltage through a second power voltage output terminal, and wherein the blocking of the leakage current path comprises blocking the leakage current path by using a diode, wherein an anode of the diode is connected to the first power voltage output terminal, and a cathode of the diode is connected to the second power voltage output terminal.

The blocking of the leakage current path may include turning-off a switching device disposed on the leakage current path, during the low power display mode.

The first power supplying unit may include an output amplifier for outputting the power voltage, wherein the output amplifier may include a feedback loop that is formed between an output terminal of the output amplifier and a second input terminal of the output amplifier, and wherein the feedback loop may include an intermediate node that is directly or indirectly coupled to a ground line, and wherein the switching device may be disposed between the output terminal of the output amplifier and the intermediate node.

The first power supplying unit may be a DC-DC converter, and the second power supplying unit may be a timing controller for supplying a driving control signal to a data driving unit and a gate driving unit of the display apparatus.

The first power supplying unit may output the power voltage through a first power voltage output terminal, wherein the second power supplying unit may output the power voltage through a second power voltage output terminal, and wherein the first power voltage output terminal and the second power voltage output terminal may be electrically connected to each other.

The low power display mode may be an operation mode for reducing brightness of the display apparatus, or for operating the pixel unit in such a way that only a portion of the pixel unit emits light.

The method may further include, during the normal mode, activating the first power supplying unit, and inactivating the second power supplying unit; and during the low power display mode, inactivating the first power supplying unit, and activating the second power supplying unit.

The power voltage output from the first power supplying unit and the power voltage output from the second power supplying unit may have different voltage levels.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0080884, filed on Aug. 20, 2010, in the Korean Intellectual Property Office, and entitled: "Method and Apparatus for Supplying Power for Display Apparatus," is incorporated by reference herein in its entirety.

Reference will now be made in detail to embodiments, examples of which are illustrated in the accompanying drawings. Also, while describing the embodiments, detailed descriptions about related well-known functions or configurations that may diminish the clarity of the points of the embodiments are omitted. Terms or words used herein shall not be limited to having common or dictionary meanings, but have meanings corresponding to technical aspects that most suitably express the embodiments. Like reference numerals refer to like elements throughout.

Figure 1:
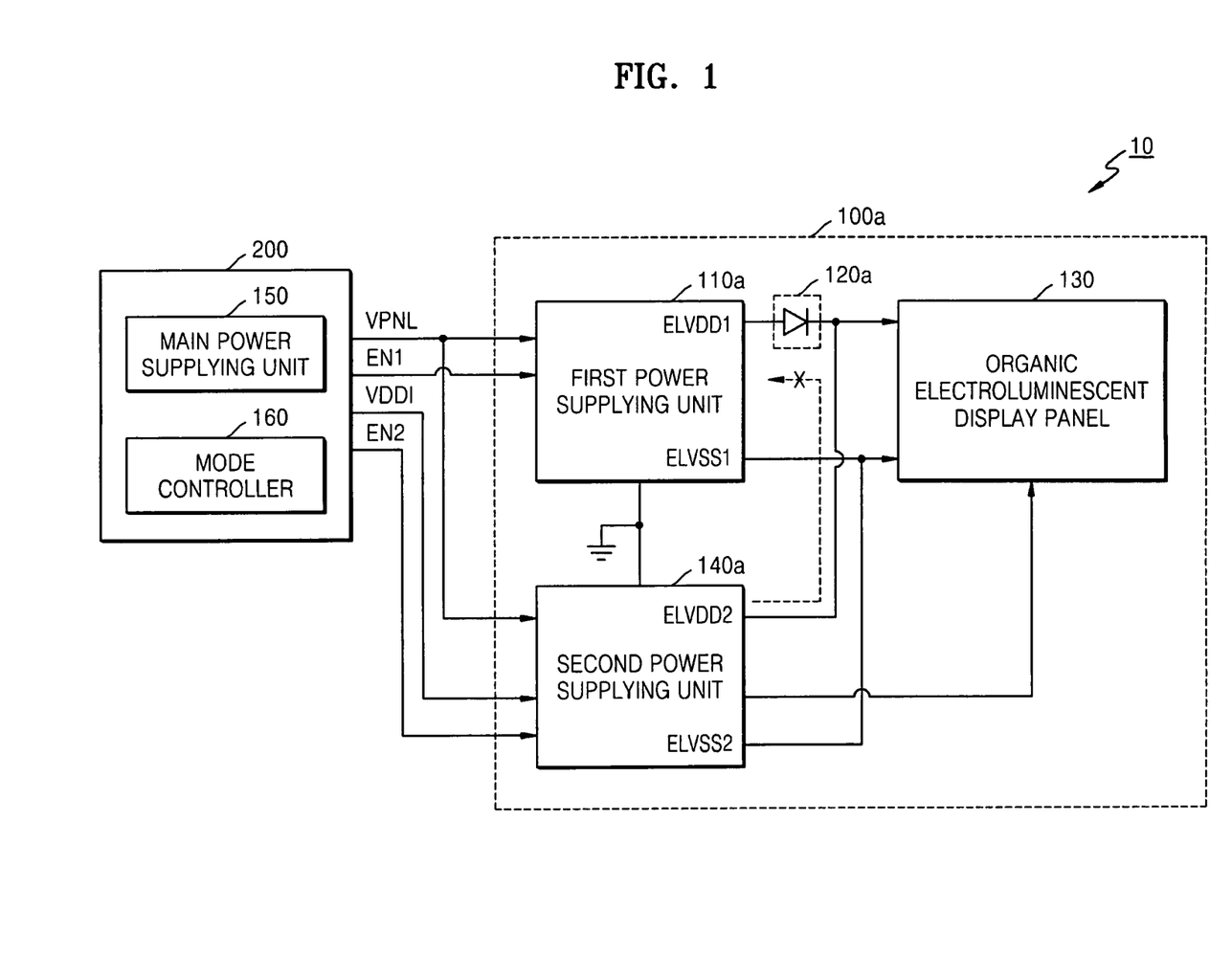
FIG. 1 illustrates a structural diagram of an electronic apparatus according to an embodiment.

FIG. 1 illustrates a structural diagram of an electronic apparatus 10 according to an embodiment. The electronic apparatus 10 includes a main device unit 200 and a display device 100a. For example, the electronic apparatus 10 may be a cellular phone, a digital camera, a laptop computer, or the like.

The main device unit 200 indicates a portion of the electronic apparatus 10 excluding the display device 100a. The main device unit 200 may include a main power supplying unit 150, a mode controller 160, and the like.

The main power supplying unit 150 receives power from an external power source and supplies the power to each component of the electronic apparatus 10, or alternatively, may supply power stored in a battery to each component of the electronic apparatus 10. The main power supplying unit 150 generates a panel power voltage (VPNL), a logic driving voltage (VDDI), and the like, by using a voltage output from the external power source or a voltage output from the battery, and may output the panel power voltage (VPNL), the logic driving voltage (VDDI), and the like, to the display device 100a.

The mode controller 160 may control an operation mode of the electronic apparatus 10. According to an embodiment, the operation mode of the electronic apparatus 10 may include a normal mode, a low power display mode, and a stand-by mode.

The normal mode is a general operation mode in which almost all functions of the electronic apparatus 10 are active.

The low power display mode is an operation mode for reducing overall brightness of the display device 100a or operating only some pixels of the display device 100a, in order to reduce power consumption of the electronic apparatus 10. For example, when there is no user input for a predetermined period of time, the electronic apparatus 10 may operate in the low power display mode in order to reduce the power consumption of the electronic apparatus 10. As another example, when the electronic apparatus 10 is driven by the battery, if a remaining amount of energy stored in the battery is equal to or less than a predetermined amount, the electronic apparatus 10 may operate in the low power display mode in order to increase an available time of the electronic apparatus 10. In addition, while driving only some pixels in the low power display mode, the electronic apparatus 10 may still perform functions of a clock, a calendar, a to-do list, or the like.

The stand-by mode is an operation mode in which light is not emitted from the display device 100a while the electronic apparatus 10 is powered on. For example, when the electronic apparatus operates in the low power display mode, if there is no user input for a predetermined period of time, the electronic apparatus 10 may be operate in the stand-by mode. As another example, when the remaining amount of energy stored in the battery is equal to or less than a predetermined amount, if there is no user input for a predetermined period of time, the electronic apparatus 10 may be transited from the normal mode to the stand-by mode.

In each operation, the mode controller 160 may output a first enable signal EN1 and a second enable signal EN2 to a first power supplying unit 110a and a second power supplying unit 140a, respectively, so that the display device 100a may control a method of applying a power voltage to an organic electroluminescent display panel 130.

In FIG. 1, the mode controller 160 is included in the main device unit 200, but the present embodiment is not limited thereto. Alternatively, the mode controller 160 may be included in the display device 100a. For example, the mode controller 160 included in the display device 100a may control whether to activate the first power supplying unit 110a or the second power supplying unit 140a, according to a mode controlling signal output from the main device unit 200. Alternatively, the mode controller 160 is included in the first power supplying unit 110a or the second power supplying unit 140a, and controls whether to activate the first power supplying unit 110a or the second power supplying unit 140a.

The display device 100a may include the first power supplying unit 110a, a leakage current blocking unit 120a, the organic electroluminescent display panel 130, and the second power supplying unit 140a. The display device 100a may include any of various kinds of display panels such as a liquid crystal display panel, a field emission display (FED) panel, or the organic electroluminescent display panel 130. Hereinafter, throughout this specification, the electronic apparatus 10 will be described in terms of a case where the display device 100a includes the organic electroluminescent display panel 130.

Figure 2:
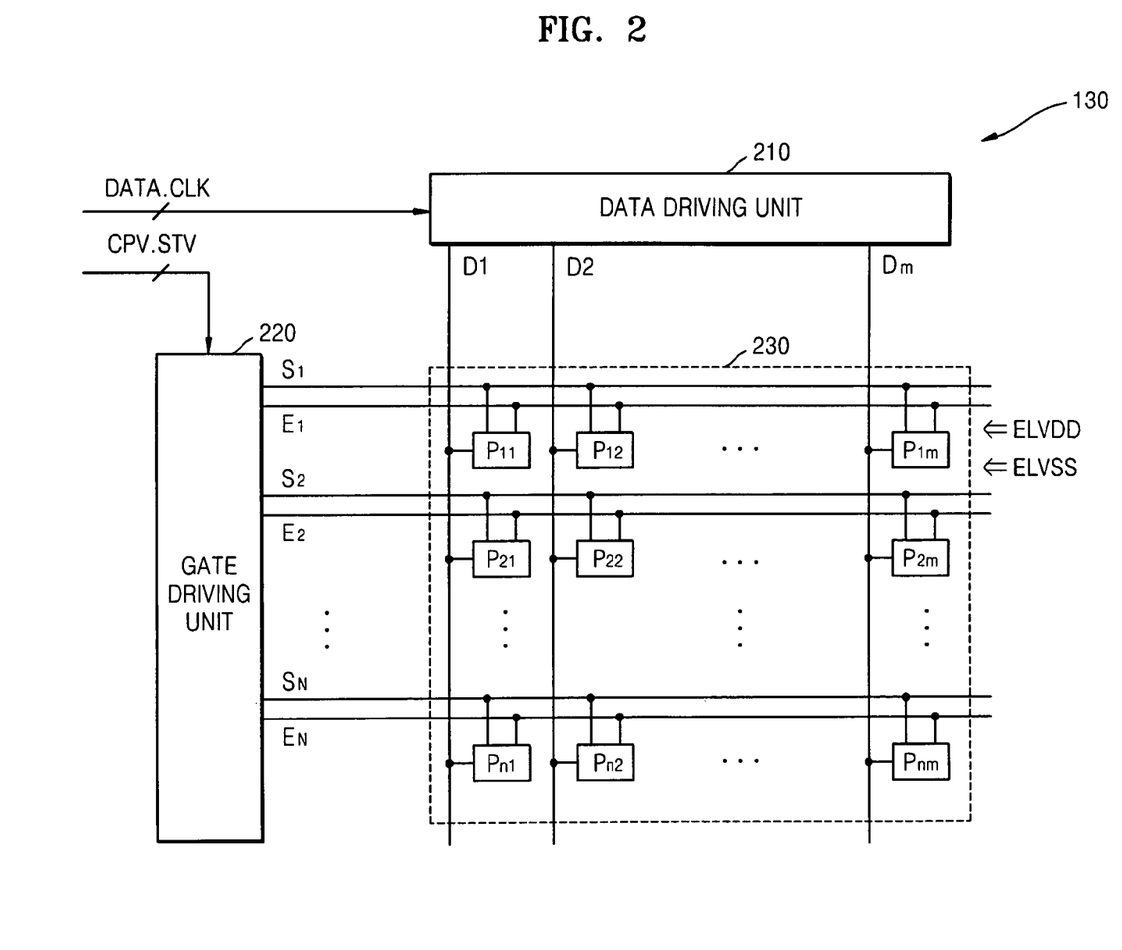
FIG. 2 illustrates a structural diagram of an organic electroluminescent display panel of FIG. 1, according to an embodiment.

The organic electroluminescent display panel 130 receives a power voltage from the first power supplying unit 110a or the second power supplying unit 140a so as to display an image corresponding to input data. The power voltage may include a high power voltage ELVDD and a low power voltage ELVSS. FIG. 2 is a structural diagram of the organic electroluminescent display panel 130 of FIG. 1, according to an embodiment.

Referring to FIG. 2, the organic electroluminescent display panel 130 includes a data driving unit 210, a gate driving unit 220, and a pixel unit 230. The data driving unit 210 applies data voltages corresponding to input image data to a plurality of pixels $P_{11}$ through $P_{nm}$ through data lines $D_1$ through $D_m$, respectively. The gate driving unit 220 outputs scan signals to the pixels $P_{11}$ through $P_{nm}$ through scan lines $S_1$ through $S_n$, respectively, and outputs light-emission controlling signals through light-emission controlling lines $E_1$ through $E_n$, respectively. The pixel unit 230 includes the pixels $P_{11}$ through $P_{nm}$ connected to the scan lines $S_1$ through $S_n$, the light-emission controlling lines $E_1$ through $E_n$, and the data lines $D_1$ through $D_m$.

The pixel unit 230 includes the pixels $P_{11}$ through $P_{nm}$ disposed at intersections of the scan lines $S_1$ through $S_n$, the light-emission controlling lines $E_1$ through $E_n$, and the data lines $D_1$ through $D_m$. As shown in FIG. 2, the pixels $P_{11}$ through $P_{nm}$ may be arranged in an n*m matrix form. Each of the pixels $P_{11}$ through $P_{nm}$ includes a light-emitting device, and receives the high power voltage ELVDD and the low power voltage ELVSS for driving the light-emitting device, from an external device. In addition, each of the pixels $P_{11}$ through $P_{nm}$ provides a driving current or voltage to the light-emitting device so that the light-emitting device may emit light corresponding to the data voltages. The light-emitting device may be an organic light-emitting device (OLED).

Each of the pixels $P_{11}$ through $P_{nm}$ controls a current amount supplied to the OLED to correspond to the data voltages applied through the data lines $D_1$ through $D_m$. In addition, the OLED emits light having a brightness corresponding to the data voltages, according to the light-emission controlling signals supplied through the light-emission controlling lines $E_1$ through $E_n$.

Figure 3:
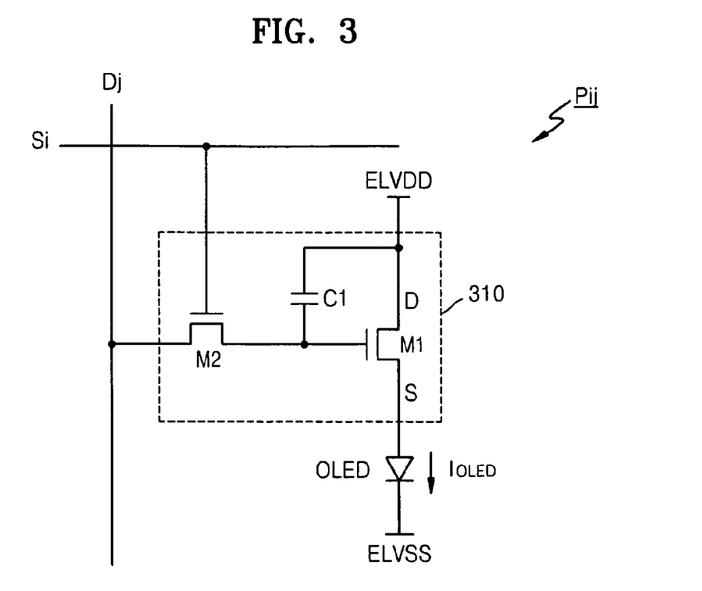
FIG. 3 illustrates a structural diagram of a pixel, according to an embodiment.

FIG. 3 is a structural diagram of a pixel Pij, according to an embodiment. Pixel circuits according to embodiments may be embodied using an N-type transistor or a P-type transistor. Hereinafter, the pixel Pij will be described in terms of a pixel circuit embodied using the N-type transistor.

The pixel Pij includes an OLED, and a pixel circuit 310. The OLED receives an amount of a driving current $I_{OLED}$ supplied by the pixel circuit 310 so as to emit light. Light emitted from the OLED has a brightness that varies according to the amount of the driving current $I_{OLED}$.

The pixel circuit 310 may include a capacitor C1, a driving transistor M1, and a scan transistor M2. The driving transistor M1 includes a first electrode D for receiving the high power voltage ELVDD, a second electrode S connected to an anode of the OLED, and a gate electrode connected to a second electrode of the scan transistor M2. The anode of the OLED is connected to the second electrode S of the driving transistor M1, and a cathode of the OLED is connected to the low power voltage ELVSS. The scan transistor M2 includes a first electrode connected to a data line Dj, the second electrode connected to the gate electrode of the driving transistor M1, and a gate electrode connected to a scan line Si. The capacitor C1 is connected between the gate electrode of the driving transistor M1 and the first electrode D of the driving transistor M1.

When a scan signal having a gate-on level is supplied to the scan transistor M2 through the scan line Si, a data voltage through the data line Dj is applied to the gate electrode of the driving transistor M1 and a first electrode of the capacitor C1 through the scan transistor M2. While a valid data voltage is applied through the data line Dj, a voltage level corresponding to the data voltage is stored in the capacitor C1. The driving transistor M1 generates the driving current $I_{OLED}$ according to the voltage level of the data voltage, and supplies the driving current $I_{OLED}$ to the OLED.

The OLED receives the driving current $I_{OLED}$ from the pixel circuit 310 and emits light having a brightness corresponding to the data voltage.

Referring to FIG. 2, the data driving unit 210 generates the data voltages by using input image data DATA, a data driving clock signal CLK, and the like, output from a timing controller (not shown), and outputs the data voltages to the pixels $P_{11}$ through $P_{nm}$ through the data lines $D_1$ through $D_m$, respectively. The data driving unit 210 may generate the data voltages from the input image data DATA by using a gamma filter, a digital-analog converting circuit, and the like. The data voltages may be respectively output to a plurality of pixels that are disposed in a single row, for a single period of the data driving clock signal CLK.

The gate driving unit 220 generates the scan signals and the light-emission controlling signals by using a gate driving clock signal CPV, a start pulse STV, and the like, input from the timing controller, and outputs the scan signals and the light-emission controlling signals to the pixels $P_{11}$ through $P_{nm}$ through the scan lines $S_1$ through $S_n$, and the light-emission controlling lines $E_1$ through $E_n$, respectively. The scan lines $S_1$ through $S_n$ and the light-emission controlling lines $E_1$ through $E_n$ may sequentially or simultaneously output the scan signals and the light-emission controlling signals on a row-by-row basis. According to an embodiment, in the organic electroluminescent display panel 130, the gate driving unit 220 may generate additional driving signals, and may output the driving signals to the pixels $P_{11}$ through $P_{nm}$, respectively.

Referring again to FIG. 1, the first power supplying unit 110a and the second power supplying unit 140a each may apply the high power voltage ELVDD and the low power voltage ELVSS to the organic electroluminescent display panel 130, in each operation mode. According to an embodiment of the present invention, in the normal mode, the first power supplying unit 110a applies the high power voltage ELVDD and the low power voltage ELVSS to the organic electroluminescent display panel 130. In the low power display mode, the second power supplying unit 140a applies the high power voltage ELVDD and the low power voltage ELVSS to the organic electroluminescent display panel 130. In addition, in the stand-by mode, the high power voltage ELVDD and the low power voltage ELVSS are not applied to the organic electroluminescent display panel 130.

The first power supplying unit 110a and the second power supplying unit 140a are commonly connected to a high power voltage applying line, and may be commonly connected to a low power voltage applying line VSSL.

That is, a first high voltage output terminal ELVDD1 for outputting a first high power voltage in the first power supplying unit 110a and a second high voltage output terminal ELVDD2 for outputting a second high power voltage in the second power supplying unit 140a may be connected to the high power voltage applying line VDDL. In addition, a first low voltage output terminal ELVSS1 for outputting a first low power voltage in the first power supplying unit 110a and a second low voltage output terminal ELVSS2 for outputting a second low power voltage in the second power supplying unit 140a may be connected to the low power voltage applying line VSSL.

According to an embodiment, voltage levels of the high power voltage ELVDD and the low power voltage ELVSS may vary according to operations modes. For example, in the normal mode, the high power voltage ELVDD with a higher voltage level than in the low power display mode and the low power voltage ELVSS with a lower voltage level than in the low power display mode may be applied to the organic electroluminescent display panel 130. Thus, the first high power voltage may have a higher voltage level than the second high power voltage, and the first low power voltage may have a lower voltage level than the second low power voltage. In the low power display mode, when an image is displayed using a lower brightness level than in the normal mode, a voltage difference between the high power voltage ELVDD and the low power voltage ELVSS may be reduced, thereby reducing brightness and power consumption of the organic electroluminescent display panel 130.

According to another embodiment, the voltage levels of the high power voltage ELVDD and the low power voltage ELVSS may be constantly maintained in the normal mode and the low power display mode. In this case, in the low power display mode, since a brightness level of the organic electroluminescent display panel 130 is to be reduced, or only some pixels of the organic electroluminescent display panel 130 are to emit light, a current amount generated when the second power supplying unit 140a outputs the high power voltage ELVDD and the low power voltage ELVSS is reduced, and thus the power consumption of the organic electroluminescent display panel 130 may be reduced in the low power display mode, compared to in the normal mode. During the low power display mode, the brightness of the organic electroluminescent display panel 130 may be controlled by, for example, adjusting a voltage level of a gamma voltage of the display device 100a.

According to an embodiment, the leakage current blocking unit 120a is provided in order to block a leakage current that may leak from the second power supplying unit 140a to the first power supplying unit 110a during the low power display mode. The leakage current blocking unit 120a is configured to block a leakage current path between the second power supplying unit 140a and the first power supplying unit 110a, or a leakage current path from the second power supplying unit 140a to a ground line through the first power supplying unit 110a, during the low power display mode. In FIG. 1, a diode D1 is connected between the first high voltage output terminal ELVDD1 of the first power supplying unit 110a and the second high voltage output terminal ELVDD2 of the second power supplying unit 140a. The diode D1 is configured so as to block a leakage current from the second high voltage output terminal ELVDD2 to the first high voltage output terminal ELVDD1. That is, an anode of the diode D1 is connected to the first high voltage output terminal ELVDD1, and a cathode of the diode D1 is connected to the second high voltage output terminal ELVDD2. The present embodiment is not limited to the case of FIG. 1. Alternatively, the diode D1 may be disposed between the first high voltage output terminal ELVDD1 and the second high voltage output terminal ELVDD2, between the first low voltage output terminal ELVSS1 and the second low voltage output terminal ELVSS2, or on a leakage current path in the first power supplying unit 110a.

The first power supplying unit 110a generates the first high power voltage and the first low power voltage from the panel power voltage (VPNL) applied by the main device unit 200, and outputs the first high power voltage and the first low power voltage to the organic electroluminescent display panel 130. Whether to control the first power supplying unit 110a is controlled by the first enable signal EN1. That is, the first power supplying unit 110a is activated by the first enable signal EN1 during the normal mode, and the first power supplying unit 110a is inactivated by the first enable signal EN1 during the low power display mode and the stand-by mode. The first power supplying unit 110a may be, for example, a DC-DC converter.

The second power supplying unit 140a generates the second high power voltage and the second low power voltage from the panel power voltage (VPNL) applied by the main device unit 200, and outputs the second high power voltage and the second low power voltage to the organic electroluminescent display panel 130. Whether to activate the second power supplying unit 140a is controlled by the second enable signal EN2. That is, the second power supplying unit 140a is activated by the second enable signal EN2 during the low power display mode, and the second power supplying unit 140a is inactivated by the second enable signal EN2 during the normal mode and the stand-by mode. However, when the second power supplying unit 140a has another function in addition to a power voltage applying function, the second enable signal EN2 controls only whether to activate the power voltage applying function of the second power supplying unit 140a. In this case, even when the second enable signal EN2 is inactivated, other functional blocks of the second power supplying unit 140a may operate normally. In addition, the second power supplying unit 140a may receive the logic driving voltage (VDDI) for driving the functional blocks of the second power supplying unit 140a, for example, a memory, or logic blocks, from the main device unit 200.

Figure 4:
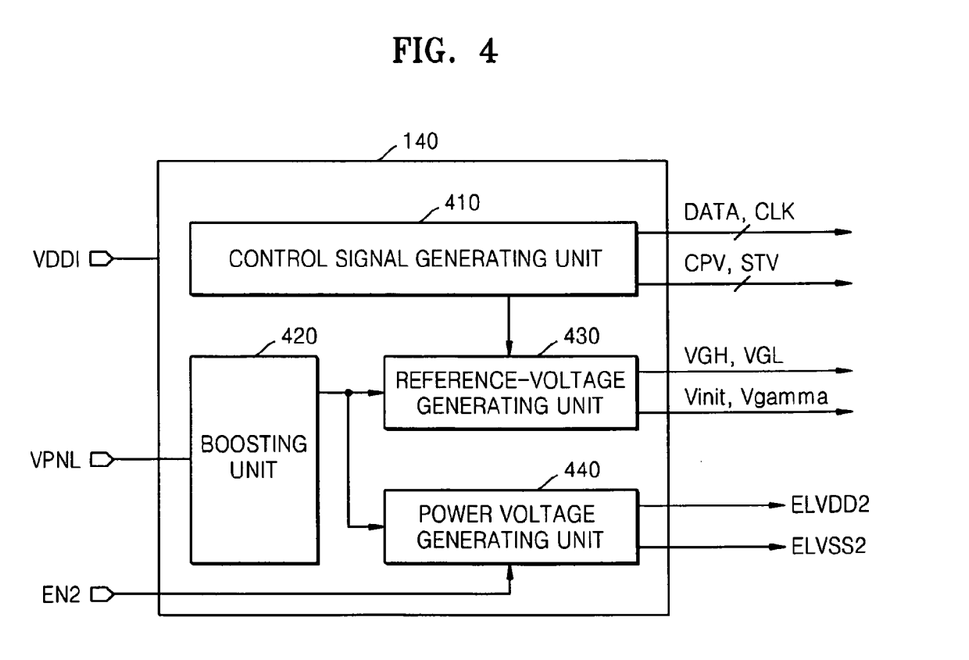
FIG. 4 illustrates a structural diagram of a second power supplying unit, according to an embodiment.

FIG. 4 illustrates a structural diagram of the second power supplying unit 140a, according to an embodiment. According to an embodiment, the second power supplying unit 140a may be a timing controller. The second power supplying unit 140a may include a control signal generating unit 410, a boosting unit 420, a reference-voltage generating unit 430, and a power voltage generating unit 440.

The control signal generating unit 410 generates and supplies driving control signals for driving the data driving unit 210 and the gate driving unit 220 of the organic electroluminescent display panel 130. For example, the control signal generating unit 410 may supply the input image data DATA, the data driving clock signal CLK, and the like, to the data driving unit 210, and may supply the gate driving clock signal CPV, the start pulse STV, and the like, to the gate driving unit 220. Kinds of control signals generated and output by the control signal generating unit 410 may vary according to embodiments.

In addition, the control signal generating unit 410 may control an operation of the second power supplying unit 140*a*, for example, an output timing of the reference-voltage generating unit 430.

The boosting unit 420 inputs and boosts the panel power voltage (VPNL). When the display device 100*a* receives the panel power voltage (VPNL) from a power source with a low voltage level, such as a battery, the panel power voltage (VPNL) needs to be boosted in order to generate the second high power voltage and the second low power voltage. The boosting unit 420 boosts the panel power voltage (VPNL), and then applies the panel power voltage (VPNL) to the reference-voltage generating unit 430 and the power voltage generating unit 440. The boosting unit 420 may be, for example, a charge pump for boosting the panel power voltage (VPNL).

The reference-voltage generating unit 430 generates reference voltages required to drive the organic electroluminescent display panel 130 from voltages output from the boosting unit 420. For example, the reference-voltage generating unit 430 may generate a gate high voltage VGH and a gate low voltage VGL, and may output the gate high voltage VGH and the gate low voltage VGL to the gate driving unit 220. The reference-voltage generating unit 430 may generate a gamma reference voltage Vgamma, and may output the gamma reference voltage Vgamma to the data driving unit 210. The reference-voltage generating unit 430 may generate an initialization voltage Vinit or a pixel reference voltage that may be required according to a structure of each pixel Pij included in the pixel unit 230, and may output the initialization voltage Vinit or the pixel reference voltage to the pixel unit 230. The reference-voltage generating unit 430 may generates the reference voltages by using a voltage dividing method, or the like.

The power voltage generating unit 440 generates the second high power voltage and the second low power voltage from the voltage output from the boosting unit 420, and outputs the second high power voltage and the second low power voltage to the second high voltage output terminal ELVDD2 and the second low voltage output terminal ELVSS2, respectively. Whether to activate the power voltage generating unit 440 is determined by the second enable signal EN2. That is, the power voltage generating unit 440 may be inactivated by the second enable signal EN2 during the normal mode and the stand-by mode, and may be activated by the second enable signal EN2 during the low power display mode. The power voltage generating unit 440 may generate the second high power voltage and the second low power voltage by using a voltage dividing method, or the like.

In FIG. 4, the reference-voltage generating unit 430 and the power voltage generating unit 440 are respectively embodied as separate blocks. Alternatively, the reference-voltage generating unit 430 and the power voltage generating unit 440 may be embodied as a single block. When the second high power voltage and the second low power voltage have the same voltage level as at least one of the reference voltages generated by the reference-voltage generating unit 430, the same voltage that is generated by the reference-voltage generating unit 430 during the low power display mode may be output to the organic electroluminescent display panel 130 as the second high power voltage and the second low power voltage. Due to this configuration, an area of the second power supplying unit 140*a* may be remarkably reduced. When the reference-voltage generating unit 430 and the power voltage generating unit 440 are embodied as a single block, output of the second high power voltage and the second low power voltage may be inactivated by the second enable signal EN2 during the normal mode and the stand-by mode, and output of the second high power voltage and the second low power voltage may be activated by the second enable signal EN2 during the low power display mode.

Figure 5:
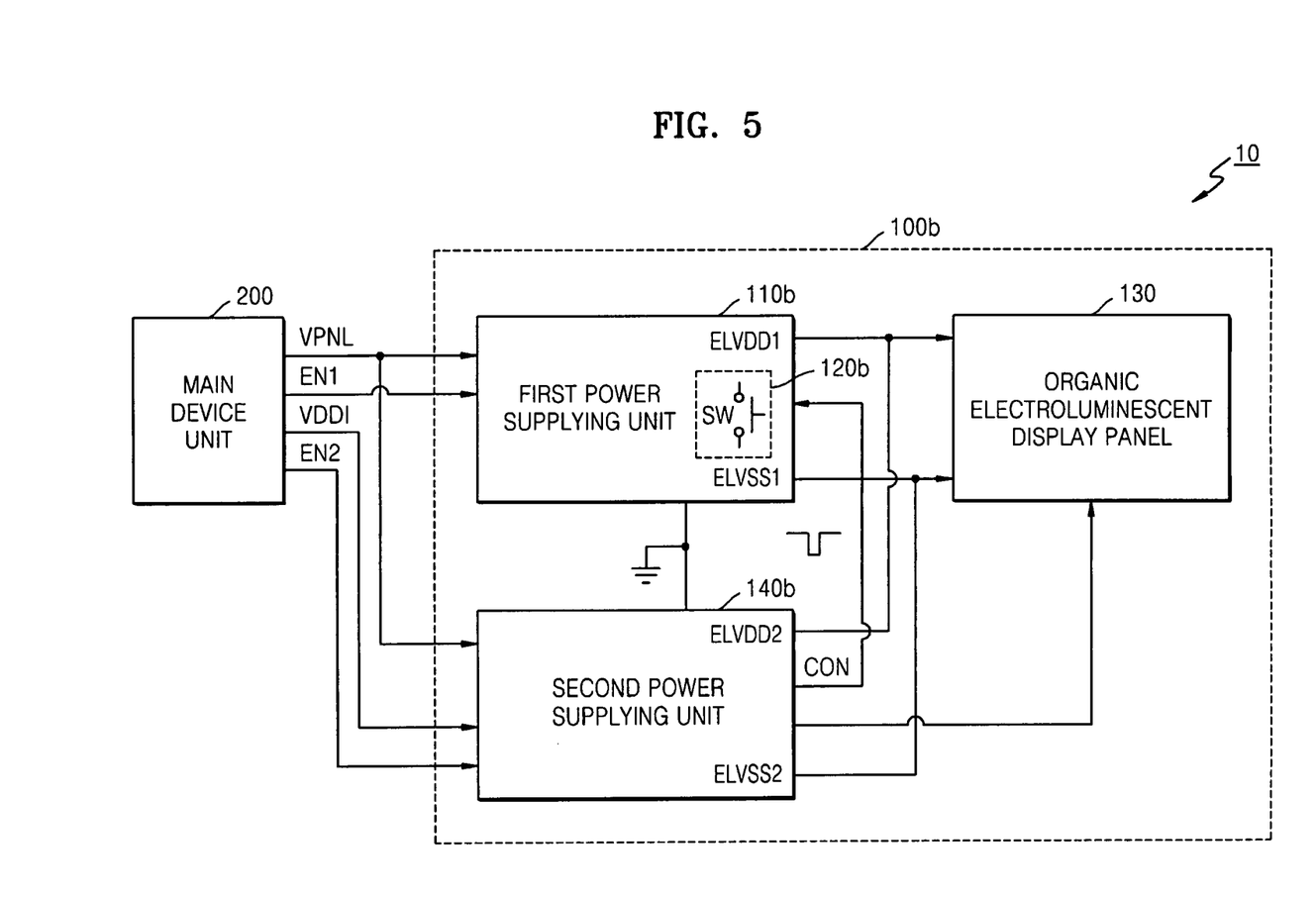
FIG. 5 illustrates a structural diagram of an electronic apparatus according to another embodiment.

FIG. 5 illustrates a structural diagram of an electronic apparatus 10 according to another embodiment.

According to another embodiment, a leakage current blocking unit 120*b* may be provided by disposing a switching device SW between the first high voltage output terminal ELVDD1 and the second high voltage output terminal ELVDD2, between the first low voltage output terminal ELVSS1 and the second low voltage output terminal ELVSS2, or in a leakage current path in the first power supplying unit 110*b*. The switching device SW may be controlled by a predetermined control signal so as to be turned-off during the low power display mode. During the normal mode and the stand-by mode, a state of the switching device SW may vary according to embodiments.

Figure 6:
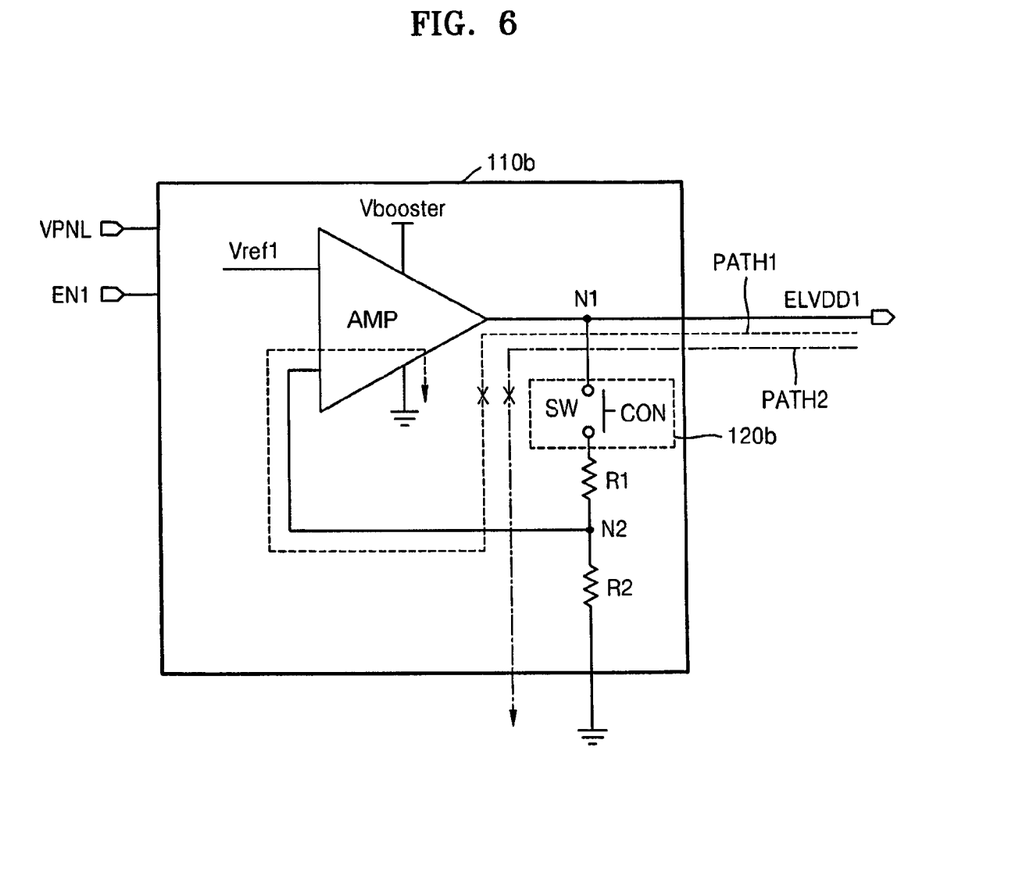
FIG. 6 illustrates a structural diagram of an output terminal of a first power supplying unit, according to an embodiment.

FIG. 6 illustrates a structural diagram of an output terminal of the first power supplying unit 110*b* according to an embodiment.

Referring to FIG. 6, the first power supplying unit 110*b* may include an output amplifier AMP for outputting the first high power voltage generated by the first power supplying unit 110*b*. The output amplifier AMP outputs the first high power voltage to the first high voltage output terminal ELVDD1. The output amplifier AMP includes a positive direct-current (DC) power supplying terminal for receiving a booster voltage Vbooster from a booster included in the first power supplying unit 110*b* and a negative DC power supplying terminal connected to a ground line. In addition, the output amplifier AMP includes a first input terminal for receiving an output-terminal reference voltage Vref1, and a second input terminal connected to an output terminal of the output amplifier AMP through a feedback loop. The feedback loop may include a first resistor R1 between a first node N1 connected to the output terminal of the output amplifier AMP and an intermediate node N2 on the feedback loop. In addition, the first power supplying unit 110*b* may include a second resistor R2 connected between the intermediate node N2 and the ground line. A voltage level input to the second input terminal of the output amplifier AMP is determined by a voltage level of the intermediate node N2 determined by a voltage division between the first node N1 and the ground line. A voltage level of the first high power voltage may be adjusted by a voltage level of the output-terminal reference voltage Vref1 input to the output amplifier AMP.

According to another embodiment, the first power supplying unit 110*b* includes the switching device SW connected in series to the first resistor R1 between the first node N1 and the intermediate node N2. The switching device SW may be turned-on or off according to a switching control signal CON output from a second power supplying unit 140*b* or the main device unit 200. According to the present embodiment, the switching device SW may be controlled so as to be turned-on during the normal mode, and to be turned-off during the low power display mode and the stand-by mode.

The switching control signal CON may be generated by the second power supplying unit 140b, and may be input to the first power supplying unit 110b. The second power supplying unit 140b may generate the switching control signal CON based on at least one of the first enable signal EN1 and the second enable signal EN2. As another example, the switching control signal CON may be the first enable signal EN1. In addition, when the first enable signal EN1 is inactivated, the switching device SW may be turned-off.

During the low power display mode, the first power supplying unit 110b is inactivated by the first enable signal EN1, but a leakage current may be generated, wherein the leakage current flows through a first leakage current path PATH1 and a second leakage current path PATH2 formed through the second high voltage output terminal ELVDD2, the first high voltage output terminal ELVDD1, and the ground line. According to the present embodiment, the switching device SW is disposed between the first node N1 and the intermediate node N2. Thus, the first leakage current path PATH1 and the second leakage current path PATH2 may be simultaneously and effectively blocked during the low power display mode.

Figure 7:
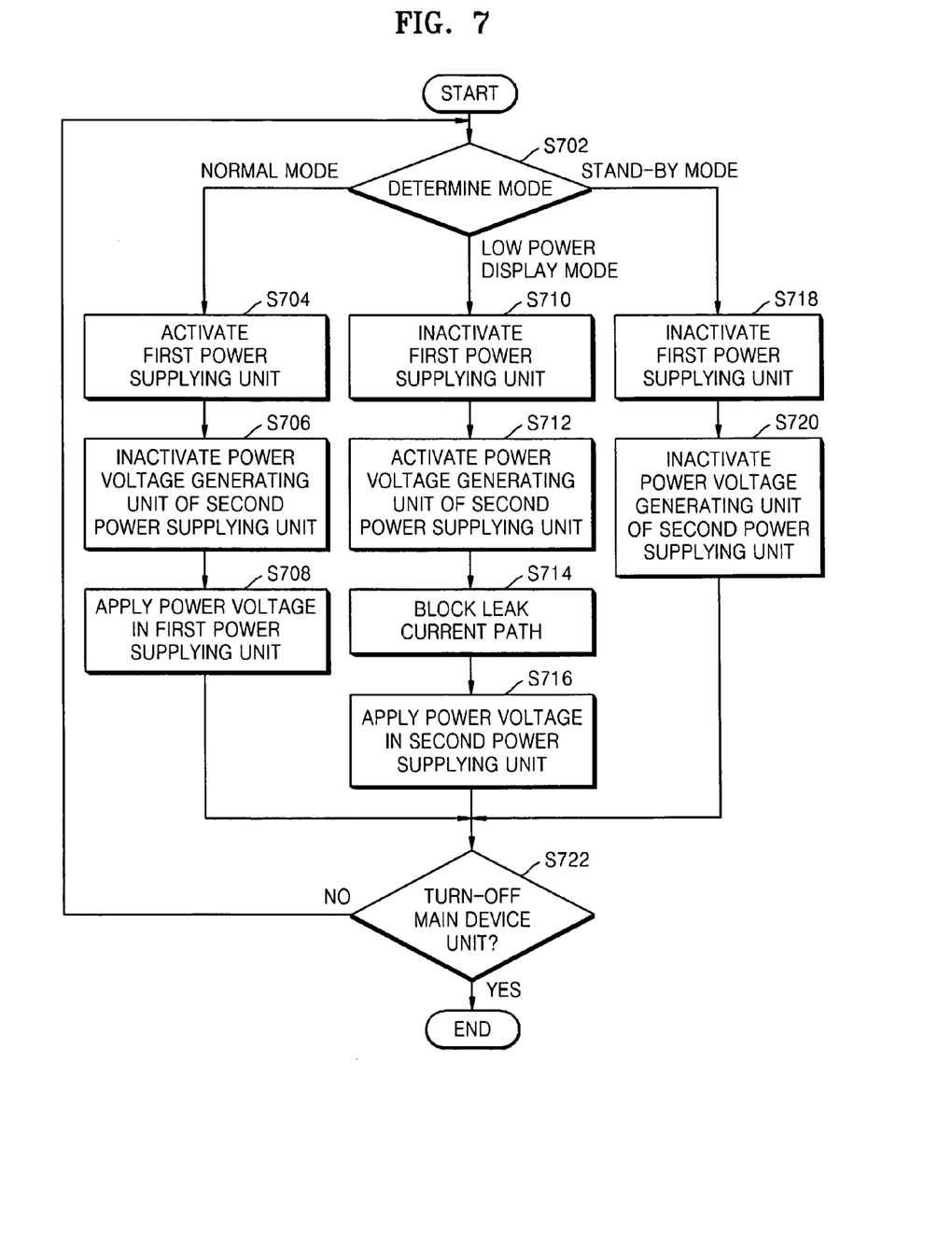
FIG. 7 illustrates a flowchart of a method of driving a display apparatus, according to an embodiment.

FIG. 7 illustrates a flowchart of a method of driving a display apparatus, according to an embodiment.

When an operation of the electronic apparatus 10 is started, an operation mode of the electronic apparatus 10 is determined (S702).

When the electronic apparatus 10 operates in a normal mode, the first power supplying unit 110a or 110b is activated (S704), and the power voltage generating unit 440 of the second power supplying unit 140a or 140b is inactivated (S706). During the normal operation, the high power voltage ELVDD and the low power voltage ELVSS are applied from the first power supplying unit 110a or 110b to the organic electroluminescent display panel 130 (S708).

When the electronic apparatus 10 operates in a low power display mode, the first power supplying unit 110a or 110b is inactivated (S710), and the power voltage generating unit 440 of the second power supplying unit 140a or 140b is activated (S712). In addition, a leakage current path from the second power supplying unit 140a or 140b to the first power supplying unit 110a or 110b or a leakage current path from the second power supplying unit 140a or 140b to the ground line through the first power supplying mode 110a or 110b is blocked (S714). To this end, when the switching device SW is disposed on the leakage current path, the switching device SW is turned-off. Next, during the low power display mode, the high power voltage ELVDD and the low power voltage ELVSS are applied from the second power supplying unit 140a or 140b to the organic electroluminescent display panel 130 (S716).

When the electronic apparatus 10 operates in the stand-by mode, the first power supplying mode 110a or 110b is inactivated (S718), and the power voltage generating unit 440 of the second power supplying unit 140a or 140b is also inactivated (S720).

While the main device unit 200 operates, determining of the operation mode (S702) and applying of the high power voltage ELVDD and the low power voltage ELVSS may be continually performed.

In a 3 to 4-inch product group, power loss due to a leakage current in a low power display mode is about 0.3 mW. However, according to the one or more embodiments, such power loss may be reduced or prevented. In the low power display mode, in consideration that the power consumption of the electronic apparatus 10 has units of 'mW', preventing of the power loss of about 0.3 mW is remarkable.

According to the one or more embodiments, power loss due to a leakage current in the low power display mode may be remarkably reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for supplying a power voltage to a pixel unit of a display apparatus, the apparatus comprising:
   a first power supplying unit configured to apply the power voltage to the pixel unit during a normal mode, the first power supplying unit including:
      an output amplifier configured to output the power voltage, and
      a feedback loop being formed between an output terminal of the output amplifier and a second input terminal of the output amplifier, the feedback loop including an intermediate node that is directly or indirectly coupled to a ground line;
   a second power supplying unit configured to apply the power voltage to the pixel unit during a low power display mode; and
   a leakage current blocking unit configured to block a leakage current path from the second power supplying unit to the first power supplying unit during the low power display mode, the leakage current blocking unit including a switching device between the output terminal of the output amplifier and the intermediate node.

2. The apparatus as claimed in claim 1, wherein the switching device is controlled to be turned-off during the low power display mode.

3. The apparatus as claimed in claim 1, wherein:
   the output amplifier includes a first input terminal for receiving an output-terminal reference voltage, the second input terminal of the output amplifier being connected to the intermediate node, and the output terminal of the output amplifier being connected to the first power voltage output terminal, and
   the first power supplying unit further includes a first resistor connected in series to the switching device between the output terminal of the output amplifier and the intermediate node, and a second resistor connected to the intermediate node and the ground line.

4. The apparatus as claimed in claim 1, wherein:
   the first power supplying unit is a DC-DC converter, and
   the second power supplying unit is a timing controller configured to supply a driving control signal to a data driving unit and a gate driving unit of the display apparatus.

5. The apparatus as claimed in claim 1, wherein the second power supplying unit comprises:
   a control signal generating unit configured to generate a driving control signal for driving a data driving unit and a gate driving unit of the display apparatus, and to output the driving control signal to the data driving unit and the gate driving unit; and
   a power voltage generating unit configured to generate the power voltage.

6. The apparatus as claimed in claim 1, wherein:
the first power voltage supplying unit includes a first power voltage output terminal for outputting the power voltage,
the second power supplying unit includes a second power voltage output terminal for outputting the power voltage, and
the first power voltage output terminal and the second power voltage output terminal are electrically connected to each other.

7. The apparatus as claimed in claim 1, wherein the low power display mode is an operation mode for reducing brightness of the display apparatus or for operating the pixel unit in such a way that only a portion of the pixel unit emits light.

8. The apparatus as claimed in claim 1, wherein:
during the normal mode, the first power supplying unit is activated and the second power supplying unit is inactivated, and
during the low power display mode, the first power supplying unit is inactivated and the second power supplying unit is activated.

9. The apparatus as claimed in claim 1, wherein the power voltage output from the first power supplying unit and the power voltage output from the second power supplying unit have different voltage levels.

10. A method of supplying a power voltage to a pixel unit of a display apparatus, the method comprising:
applying the power voltage to the pixel unit during a normal mode via a first power supplying unit, the first power supplying unit comprises an output amplifier for outputting the power voltage;
applying the power voltage to the pixel unit during a low power display mode via a second power supplying unit;
forming a feedback loop between an output terminal of the output amplifier and a second input terminal of the output amplifier, the feedback loop including an intermediate node that is directly or indirectly coupled to a ground line; and
blocking a leakage current path from the second power supplying unit to the first power supplying unit during the low power display mode, wherein blocking the leaking current path includes providing a switching device between the output terminal of the output amplifier and the intermediate node.

11. The method as claimed in claim 10, wherein blocking the leakage current path includes turning-off the switching device.

12. The method as claimed in claim 10, wherein the first power supplying unit is a DC-DC converter, and
wherein the second power supplying unit is a timing controller supplying a driving control signal to a data driving unit and a gate driving unit of the display apparatus.

13. The method as claimed in claim 10, wherein the first power supplying unit outputs the power voltage through a first power voltage output terminal,
wherein the second power supplying unit outputs the power voltage through a second power voltage output terminal, and
wherein the first power voltage output terminal and the second power voltage output terminal are electrically connected to each other.

14. The method as claimed in claim 10, wherein the low power display mode is an operation mode for reducing brightness of the display apparatus, or for operating the pixel unit in such a way that only a portion of the pixel unit emits light.

15. The method as claimed in claim 10, further comprising:
during the normal mode, activating the first power supplying unit, and inactivating the second power supplying unit; and
during the low power display mode, inactivating the first power supplying unit, and activating the second power supplying unit.

16. The method as claimed in claim 10, wherein the power voltage output from the first power supplying unit and the power voltage output from the second power supplying unit have different voltage levels.

* * * * *